Dec. 25, 1951          T. E. EBERT          2,579,557
COUNTER ELECTRODE OF SELENIUM RECTIFIERS
Filed Dec. 11, 1947
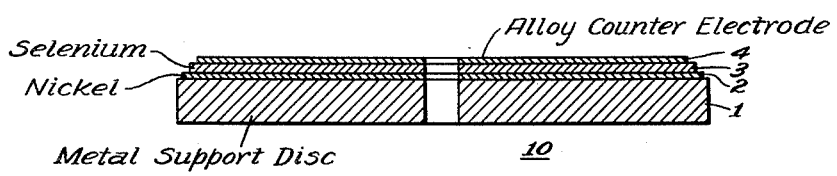
WITNESSES:
Robert C. Baird
Robert E. Ross
INVENTOR
Theodore E. Ebert.
BY
James N. Ely
ATTORNEY Patented Dec. 25, 1951

2,579,557

UNITED STATES PATENT OFFICE 2,579,557

COUNTER ELECTRODE OF SELENIUM RECTIFIERS

Theodore E. Ebert, Pittsburgh, Pa., assignor to Westinghouse Electric Corporation, East Pittsburgh, Pa., a corporation of Pennsylvania Application December 11, 1947, Serial No. 791,072

3 Claims. (Cl. 175—366)

1

This invention relates generally to electric-current rectifiers of the selenium type, and more particularly, to the composition of the alloy employed as the counter electrode.

Alloys previously used as counter electrodes in selenium rectifiers have generally had one or more disadvantages, such as having a high electrical resistance in the forward direction, or allowing an excessive back leakage of current, or having a melting point so high that the alloy cannot conveniently be applied to the selenium layer in the manufacturing process.

An object of this invention is to provide a counter electrode of a zinc and tin alloy for dry type rectifiers.

A more specific object of the invention is to provide a dry-type rectifier having a forward electrode of selenium and a counter electrode of a zinc and tin alloy.

For a fuller understanding of the nature and objects of the invention, reference should be had to the following detailed description, taken in conjunction with the accompanying drawing, in which is illustrated a form of the device which embodies the teachings of the invention.

Referring now to the drawing, there is illustrated a rectifier 10. The rectifier 10 comprises a plurality of cooperating component layers assembled in operative relation. In the embodiment illustrated a metal disc 1 is utilized for supporting the other components, a layer 2 of nickel being electroplated or otherwise deposited and bonded directly to the disc 1. A layer 3 of selenium is deposited on the nickel layer 2.

In accordance with this invention, a layer 4 of a zinc-tin alloy is then sprayed or otherwise deposited on the selenium layer 3 to function as the counter electrode in the rectifier. The composition of this counter electrode layer 4 determines, to a large degree, the electrical characteristics of the rectifier 10, since rectification takes place between the selenium layer 3 and the alloy counter electrode layer 4. That is, current will flow from the selenium layer 3 to the zinc-tin alloy layer 4, but will not flow in the opposite direction.

I have discovered that zinc-tin alloys having a tin content of between 45% and 70% by weight of the alloy will provide a counter electrode of low electrical resistance and will effect satisfactory rectification of the current. The alloys within the range given have melting points sufficiently low that they can be deposited on the previously deposited layers without damage to the selenium layer. Also, the zinc-tin alloys employed as the counter electrode layer 4 have desirable low electrical resistance characteristics.

2

In a particular embodiment of the invention an alloy of 67% tin with the remainder zinc, has been used as the counter electrode. This alloy has a melting point of about 325° C., which is sufficiently low that the alloy can be easily applied to the layer of selenium by conventional metal spraying apparatus. In practice, it is found that a number of rectifiers constructed with a counter electrode made of this alloy have an average forward voltage drop, with a current of 1 ampere flowing through the rectifier, of about .97 volt, and that the reverse current or back leakage when a reverse voltage of 15 volts is applied to the rectifier is about 26 milliamperes.

Another alloy found to be equally satisfactory for use as the counter electrode is one composed of 50% tin and the remainder zinc. Although the melting point of this alloy is about 350° C., it also can be easily applied by conventional metal spraying apparatus. Tests on a selenium rectifier constructed with a counter electrode made of this alloy showed, under test conditions similar to those hereinbefore described, a forward voltage drop of .85 volt and a back leakage of 30 milliamperes.

In practice, rectifiers having like characteristics can be readily produced where the counter electrode is formed of the zinc-tin alloy as the alloy can be readily duplicated. All of the alloys within the range of 45% to 70% tin and the balance zinc are suitable for this use, the counter electrodes thus produced having similar electrical characteristics.

I claim as my invention:

1. In a dry-type rectifier, the combination comprising, a forward electrode of selenium and a counter electrode of an alloy composed of 45% to 70% tin and 55% to 30% zinc.

2. In a dry-type rectifier, the combination comprising, a forward electrode of selenium and a counter electrode of an alloy composed of 67% tin and the balance zinc.

3. In a dry-type rectifier, the combination comprising, a forward electrode of selenium and a counter electrode of an alloy composed of 50% tin and the balance zinc.

THEODORE E. EBERT.

REFERENCES CITED

The following references are of record in the file of this patent:

UNITED STATES PATENTS

| Number | Name | Date |
|---|---|---|
| 756,676 | Midgley | Apr. 5, 1904 |
| 2,124,306 | Osawa | July 19, 1938 |